US011977975B2

(12) United States Patent
Iwakura (10) Patent No.: US 11,977,975 B2
(45) Date of Patent: May 7, 2024

(54) LEARNING METHOD USING MACHINE LEARNING TO GENERATE CORRECT SENTENCES, EXTRACTION METHOD, AND INFORMATION PROCESSING APPARATUS

(71) Applicant: FUJITSU LIMITED, Kawasaki (JP)

(72) Inventor: Tomoya Iwakura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 347 days.

(21) Appl. No.: 16/801,930

(22) Filed: Feb. 26, 2020

(65) Prior Publication Data

US 2020/0279159 A1 Sep. 3, 2020

(30) Foreign Application Priority Data

Mar. 1, 2019 (JP) ................................ 2019-038079

(51) Int. Cl.
*G06N 3/08* (2023.01)
*G06F 40/295* (2020.01)

(52) U.S. Cl.
CPC ............ *G06N 3/08* (2013.01); *G06F 40/295* (2020.01)

(58) Field of Classification Search
CPC ....... G06N 3/08; G06N 3/0454; G06F 40/295
See application file for complete search history.

(56) References Cited

U.S. PATENT DOCUMENTS

| 10,915,707 | B2* | 2/2021 | Taraba ..................... G06F 40/30 |
| 11,093,714 | B1* | 8/2021 | Bhatia .................. G06N 3/0445 |
| 2008/0201134 | A1* | 8/2008 | Iwakura ................ G06F 40/284 |
| | | | 704/10 |
| 2012/0011428 | A1* | 1/2012 | Chisholm ............. G06F 40/169 |
| | | | 715/230 |
| 2016/0196258 | A1* | 7/2016 | Ma .......................... G06F 40/51 |
| | | | 704/8 |

(Continued)

FOREIGN PATENT DOCUMENTS

CN 109190120 A * 1/2019 ........... G06F 17/278

OTHER PUBLICATIONS

Zhang et al. Multitask Learning for Chinese Named Entity Recognition. @ Springer Nature Switzerland AG 2018 R. Hong et al. (Eds.): PCM 2018, LNCS 11165, pp. 653-662, 2018. https://doi.org/10.1007/978-3-030-00767-6_60 (Year: 2018).*

(Continued)

*Primary Examiner* — Li Wu Chang
(74) *Attorney, Agent, or Firm* — Fujitsu Intellectual Property Center (57) ABSTRACT

A learning method to be executed by a computer, the learning method includes when a first input sentence in which a predetermined target is represented by a first named entity is input to a first machine learning model, learning a first parameter of the first machine learning model such that a value output from the first machine learning model approaches correct answer information corresponding to the first input sentence; and when an intermediate representation generated when the first input sentence is input to the first machine learning model and a second input sentence in (Continued)

which the predetermined target is represented by a second named entity are input to a second machine learning model, learning the first parameter and a second parameter of the second machine learning model such that a value output from the second machine learning model approaches correct answer information corresponding to the second input sentence.

9 Claims, 11 Drawing Sheets

(56) References Cited

U.S. PATENT DOCUMENTS

| | | | | |
|---|---|---|---|---|
| 2018/0075351 | A1* | 3/2018 | Iwakura | G06V 10/26 |
| 2019/0355270 | A1* | 11/2019 | McCann | G06N 3/082 |
| 2021/0042469 | A1* | 2/2021 | Saito | G06F 16/383 |
| 2021/0232768 | A1* | 7/2021 | Ling | G06F 40/295 |

OTHER PUBLICATIONS

Dang et al. D3NER: biomedical named entity recognition using CRF-biLSTM improved with fine-tuned embeddings of various linguistic information. Bioinformatics, 34(20), 2018, 3539-3546 doi: 10.1093/bioinformatics/bty356. Advance Access Publication Date: Apr. 30, 2018 (Year: 2018).*

Watanabe et al. Multi-Task Learning for Chemical Named Entity Recognition with Chemical Compound Paraphrasing. Proceedings of the 2019 Conference on Empirical Methods in Natural Language Processing and the 9th International Joint Conference on Natural Language Processing, pp. 6244-6249. (Year: 2019).*

Zeng et al. LSTM-CRF for Drug-Named Entity Recognition. Entropy 2017, 19, 283; doi: 10.3390/e19060283. 12 pages. (Year: 2017).*

Panchendrarajan et al. Bidirectional LSTM-CRF for Named Entity Recognition. 32nd Pacific Asia Conference on Language, Information and Computation Hong Kong, Dec. 1-3, 2018. pp 531-540. (Year: 2018).*

Back-propagation—definition of Back-propagation by The FreeDictionary. American Heritage® Dictionary of the English Language, Fifth Edition. Copyright @ 2016 by Houghton Mifflin Harcourt Publishing Co. Retrieved from [https://www.thefreedictionary.com/Back-propagation] on [Sep. 6, 2022]. (Year: 2016).*

Jason P.C. Chiu et al., "Named Entity Recognition with Bidirectional LSTM-CNNs," Transactions of the Association for Computational Linguistics, vol. 4, pp. 357-370, 2016; Published Jul. 2016 (Total 14 pages).

* cited by examiner

| WORD | CORRECT ANSWER TAG |
|---|---|
| L- | B-CHEM |
| PHENYL | I-CHEM |
| ALANINE | E-CHEM |
| (S)- | B-CHEM |
| PHENYL | I-CHEM |
| ALANINE | E-CHEM |
| (S)- | B-CHEM |
| α- | I-CHEM |
| AMINOBENZENE | I-CHEM |
| PROPANOIC ACID | E-CHEM |
| ... | ... |
| COMPOUND | O |
| L- | B-CHEM |
| PHENYL | I-CHEM |
| ALANINE | E-CHEM |
| IS | O |
| ... | |
| (S)- | B-CHEM |
| A- | I-CHEM |
| AMINOBENZENE | I-CHEM |
| PROPANIC | I-CHEM |
| ACID | E-CHEM |
| IS | O |
| ... | |

| INPUT SENTENCE BEFORE PARAPHRASING | INPUT SENTENCE AFTER PARAPHRASING |
|---|---|
| L-PHENYLALANINE | (S)-PHENYLALANINE |
| (S)-PHENYLALANINE | L-PHENYLALANINE |
| (S)-α-AMINOBENZENEPROPANOIC ACID | (S)-3-PHENYL-2-AMINOPROPANOIC ACID |
| ... | ... |

FIG. 7

| INPUT SENTENCE (COMPANY NAME) | INPUT SENTENCE OF PARAPHRASE (ABBREVIATED NAME) |
|---|---|
| ABC COMPANY LIMITED | ABC CO., LTD. |
| XYZ COMPANY LIMITED | XYZ CO., LTD. |
| CCC MEDICAL CORPORATION | CCC MED. CORP. |
| AAA MEDICAL CORPORATION | AAA MED. CORP. |
| BBB INCORPORATED FOUNDATION | BBB FOUNDATION |
| ... | ... |

FIG. 8

<a href='xx.com'>ABC RES. INST.</a> → <title>ABC RES. INST.</title>

| BEFORE PARAPHRASING | AFTER PARAPHRASING |
|---|---|
| ABC RESEARCH INSTITUTE | ABC RES. INST. |

<a href='xx.com'>CCC CO., LTD.</a> → <title>CCC COMPANY LIMITED</title>

| BEFORE PARAPHRASING | AFTER PARAPHRASING |
|---|---|
| CCC COMPANY LIMITED | CCC CO., LTD. |

PHENYLALANINE

- C₉H₁₁NO₂
- (S)-α-AMINOBENZENEPROPANOIC ACID
- (S)-2-BENZYLGLYCINE
- (S)-PHENYLALANINE
- (2S)-2-AMINO-3-PHENYLPROPIONIC ACID
- L-PHENYLALANINE
- (−)-L-PHENYLALANINE
- (S)-2-AMINO-3-PHENYLPROPANOIC ACID
- (S)-2-AMINO-3-PHENYLPROPANOIC ACID
- PHENYLALANINE
- Phe-OH
- L-Phe-OH
- (S)-3-PHENYL-2-AMINOPROPIONIC ACID
- (2S)-2-AMINO-3-PHENYLPROPANOIC ACID
- (−)-PHENYLALANINE
- L-Phenylalanine
- (−)-Phenylalanine
- (−)-L-Phenylalanine
- ANTIBIOTIC SUBSTANCE FN-1636
- Antibiotic FN-1636
- L-β-PHENLALANINE
- L-β-Phenylalanine
- (S)-2-Benzylglycine
- (2S)-2-Amino-3-phenylpropionic acid
- (S)-2-phenylalanine
- Phenylalanine
- (S)-α-Aminobenzenepropanoic acid
- (S)-2-Amino-3-phenylpropionic acid
- (2S)-2-Amino-3-phenylpropionic acid
- (S)-3-phenyl-2-aminopropionic acid
- (S)-2-Amino-3-phenylpropionic acid

FIG. 11

LEARNING METHOD USING MACHINE LEARNING TO GENERATE CORRECT SENTENCES, EXTRACTION METHOD, AND INFORMATION PROCESSING APPARATUS

CROSS-REFERENCE TO RELATED APPLICATION

This application is based upon and claims the benefit of priority of the prior Japanese Patent Application No. 2019-38079, filed on Mar. 1, 2019, the entire contents of which are incorporated herein by reference.

FIELD

The embodiment discussed herein is related to a learning method, an extraction method, and an information processing apparatus.

BACKGROUND

There is a technique for extracting a named entity from text data. For example, a named entity corresponds to a proper noun in which a personal name, an organization name, or the like is exemplified, a numerical representation in which a date, time, or the like is exemplified, and a technical term in which a chemical substance, a gene name, or the like is exemplified.

For example, a plurality of named entities to be extracted is registered in a dictionary, and text data and the dictionary are compared with each other, whereby a named entity may be extracted from the text data. For example, Jason P. C Chiu, Eric Nichols, "Named Entity Recognition with Bidirectional LSTM-CNNs" Transactions of the Association for Computational Unguistics, and the like are disclosed as a related art.

SUMMARY

According to an aspect of the embodiments, a learning method to be executed by a computer, the learning method includes when a first input sentence in which a predetermined target is represented by a first named entity is input to a first machine learning model, learning a first parameter of the first machine learning model such that a value output from the first machine learning model approaches correct answer information corresponding to the first input sentence; and when an intermediate representation generated by inputting the first input sentence to the first machine learning model and a second input sentence in which the predetermined target is represented by a second named entity are input to a second machine learning model, learning the first parameter and a second parameter of the second machine learning model such that a value output from the second machine learning model approaches correct answer information corresponding to the second input sentence.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

The number of named entities consistently continue to increase. For example, in a case of compounds, it is said that the number of compounds increases one in a minute, and a new chemical substance name (named entity) appears every time the number of compounds increases.

Figure 10:
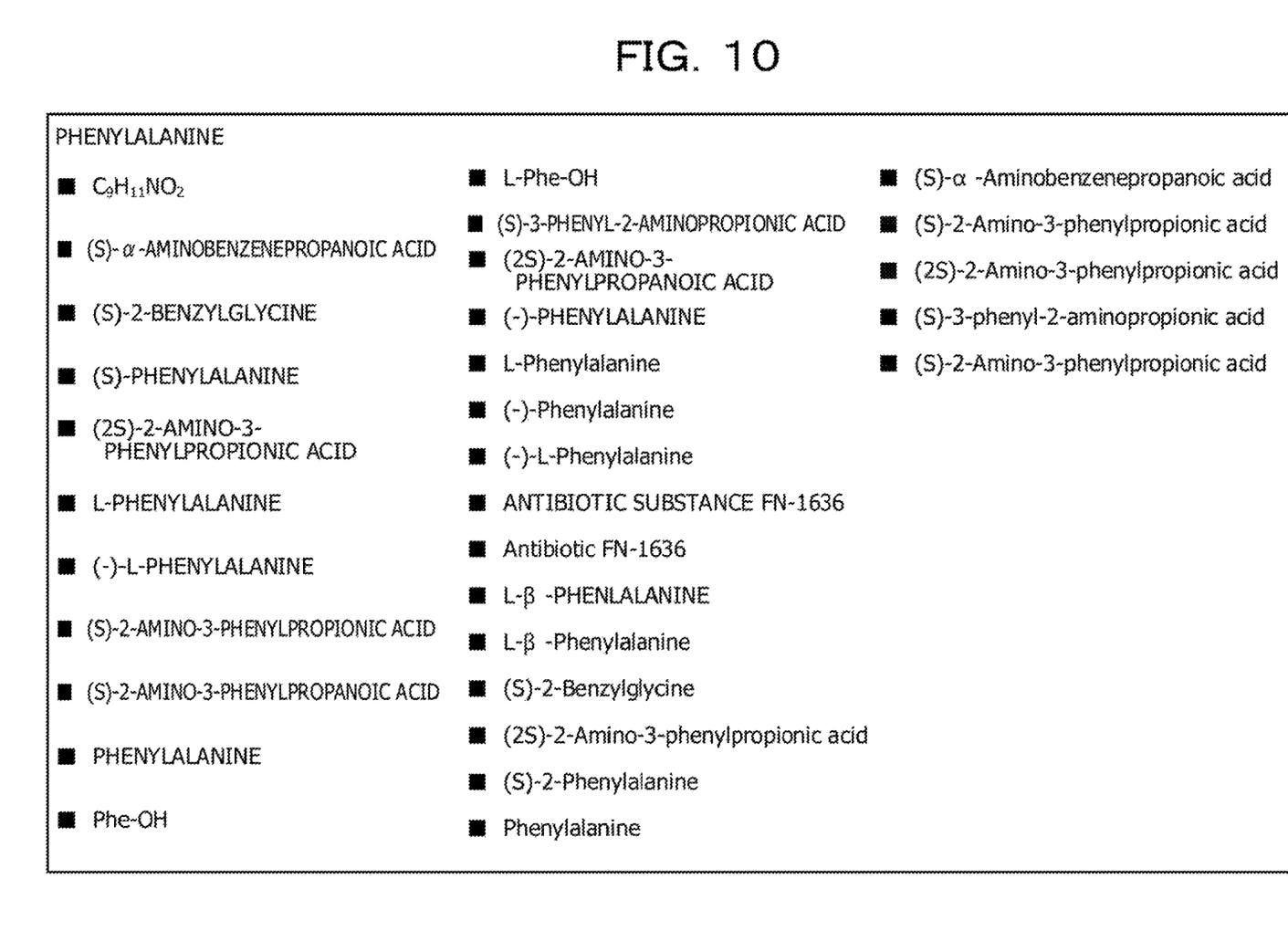
FIG. 10 is a diagram illustrating an example in which one compound has a plurality of named entities.

As for the compounds, there is a plurality of nomenclatures, and thus a single compound may have a plurality of names. FIG. 10 is a diagram illustrating an example in which a compound has a plurality of named entities. In FIG. 10, a plurality of nomenclatures corresponding to the compound "phenylalanine" is illustrated. Phenylalanine has a large number of named entities such as "$C_9H_{11}NO_2$", "(S)-α-aminobenzenepropanoic acid", "(S)-2-benzylglycine", and the like.

Figure 11:
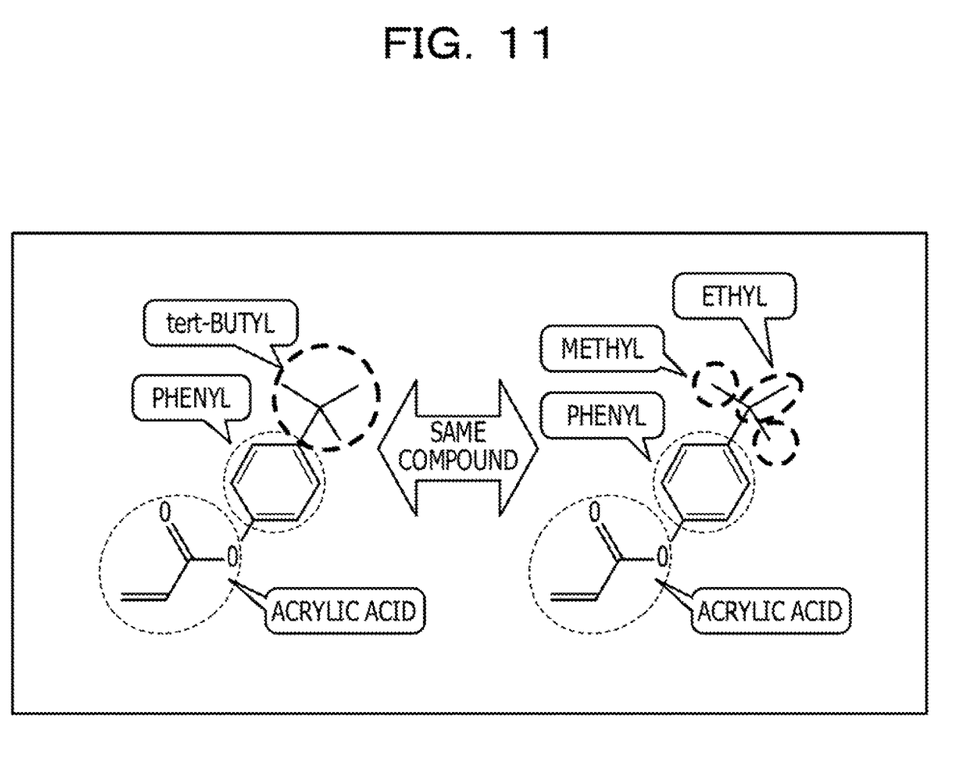
FIG. 11 is a diagram for explaining an example in which a representation problem occurs.

FIG. 11 is a diagram for explaining an example in which a representation problem occurs. In FIG. 11, a structure in which "tert-butyl" is added to phenyl acrylate is named as "acrylic acid 4-tert-butylphenyl". On the other hand, a structure in which "two methyl groups and one ethyl group (dimethylethyl)" are added to phenyl acrylate is named as "acrylic add (1, 1-dimethylethyl) phenyl". Since the structure of "tert-butyl" is the same as the structure of "dimethylethyl", the "acrylic acid 4-tert butyl phenyl" and the "acrylic acid (1, 1-dimethylethyl) phenyl" indicate the same compound.

A case in which the number of named entities increases is not limited to the case of compounds, and company names and personal names are also applicable. In the case of company names, there may be a case where different representations are used for the same company name, such as a case where an abbreviated name of the company is used instead of an official name. In the case of personal names, different nicknames may be used for the same personal name.

That is, for example, there is a problem that it is difficult to extract named entities which continue to increase day by day from text by registering the named entities in a dictionary. Therefore, a named entity extraction technique for extracting a new named entity while also using context information as a clue is used. In the case of personal names, a vocabulary indicating appearance of a personal name, such as "Ms." or "Mr.", is used as the due. In view of the above, it is desirable to extract a named entity that is difficult to define by a dictionary from text data.

Hereinafter, an embodiment of a learning method, an extraction method, a learning program, and an information processing apparatus disclosed in the present application is described in detail with reference to the drawings. The present disclosure is not limited by the embodiment.

Embodiment

The information processing apparatus according to the present embodiment performs learning of an encoder for extracting a named entity from text data and a decoder for generating another named entity in which the named entity is paraphrased. The learning performed by the information processing apparatus includes a first learning phase for performing the learning of the encoder, and a second learning phase for simultaneously performing learning of the encoder and the decoder. The information processing apparatus extracts the named entity from the text data to be processed by using the encoder in which the learning is performed in the first learning phase and the second learning phase.

Figure 1:
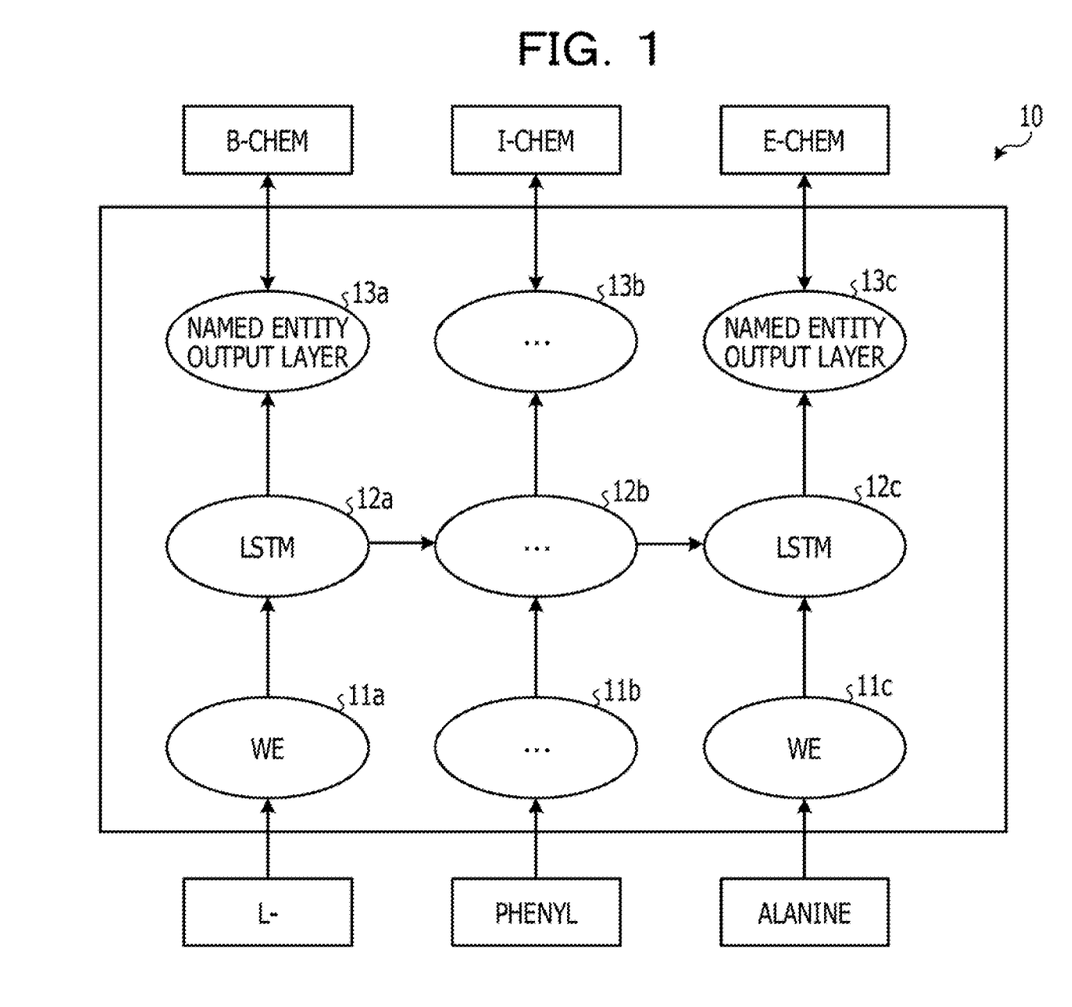
FIG. 1 is a diagram for explaining an example of a first learning phase.

FIG. 1 is a diagram for explaining an example of the first learning phase. The information processing apparatus executes an encoder 10. The encoder 10 includes word embeddings (WE) 11a to 11c, long short-term memories (LSTM) 12a to 12c, and named entity output layers 13a to 13c. When appropriate, the WEs 11a to 11c are collectively represented as the WE 11. The LSTMs 12a to 12c are collectively represented as the LSTM 12. The named entity output layers 13a to 13c are collectively represented as the named entity output layer 13.

In the example in FIG. 1, only a compound is given for simplicity. However, in practice, a sentence such as "a compound L-phenylalanine is . . . " is given, and the sentence is learned by giving a word sequence that configures a sentence and a label assigned to each word such that "a compound" is assigned with a label for words other than the named entity (O), "L-", "phenyl", and "alanine" are respectively assigned with "B-CHEM (the beginning word of the compound)", "I-CHEM (the intermediate word of the compound)", and "E-CHEM (the end word of the compound)", and "is" is assigned with a label for a word other than the named entity (O). In addition, "S-CHEM" is used in a case of a compound name having one word, such as "caffeine". The LSTM which is one of recurrent neural networks (RNN) will be described as an example.

The WE 11 is a model that generates distributed representations (vectors) of respective words included in an input sentence from the input sentence. In this embodiment, as an example, a character sequence of a named entity of a compound is described as an input sentence, but the present disclosure is not limited thereto. For example, an initial value of the WE 11 uses a result of generating vectors of respective words based on a mechanism of word2vec.

In learning, the input sentence is first encoded. For example, in FIG. 1, an output corresponding to each word is obtained by using the LSTM 12a to the LSTM 12c. A LSTM corresponding to the word "L-" is an output of the LSTM 12a.

Then, based on output results of the respective words in the LSTM 12, a probability that each of labels is assigned to each of the words is calculated by using the named entity output layers (13a to 13c), and parameters are updated such that a high probability is given to a correct answer label of each word.

The named entity output layers (13a to 13c) are output layers for calculating a probability distribution including a probability that the word is the beginning word "B-CHEM", a probability that the word is the intermediate word "I-CHEM", a probability that the word is the end word "E-CHEM", a probability that the word is the compound name having a single word "S-CHEM", and a probability that the word is a word other than the named entity (O), based on hidden state vectors input from the LSTM 12. After the probability calculation of assigning the labels is completed for all the words, the parameters are updated such that a high probability is given to the correct answer label of each word.

Targets to be updated in this example is a word vector WE, a parameter $\theta_{12}$ of the LSTM 12 for encoding, and a parameter of the named entity output layer. In this example, encoding is performed in one direction from a sentence beginning to a sentence end, but in addition to this, a result of the LSTM that performs encoding in a direction from the sentence end to the sentence beginning may also be used.

The information processing apparatus learns the encoder 10 by repeatedly executing the above processing based on a pair of another input sentence for learning and correct answer tags.

Figure 2:
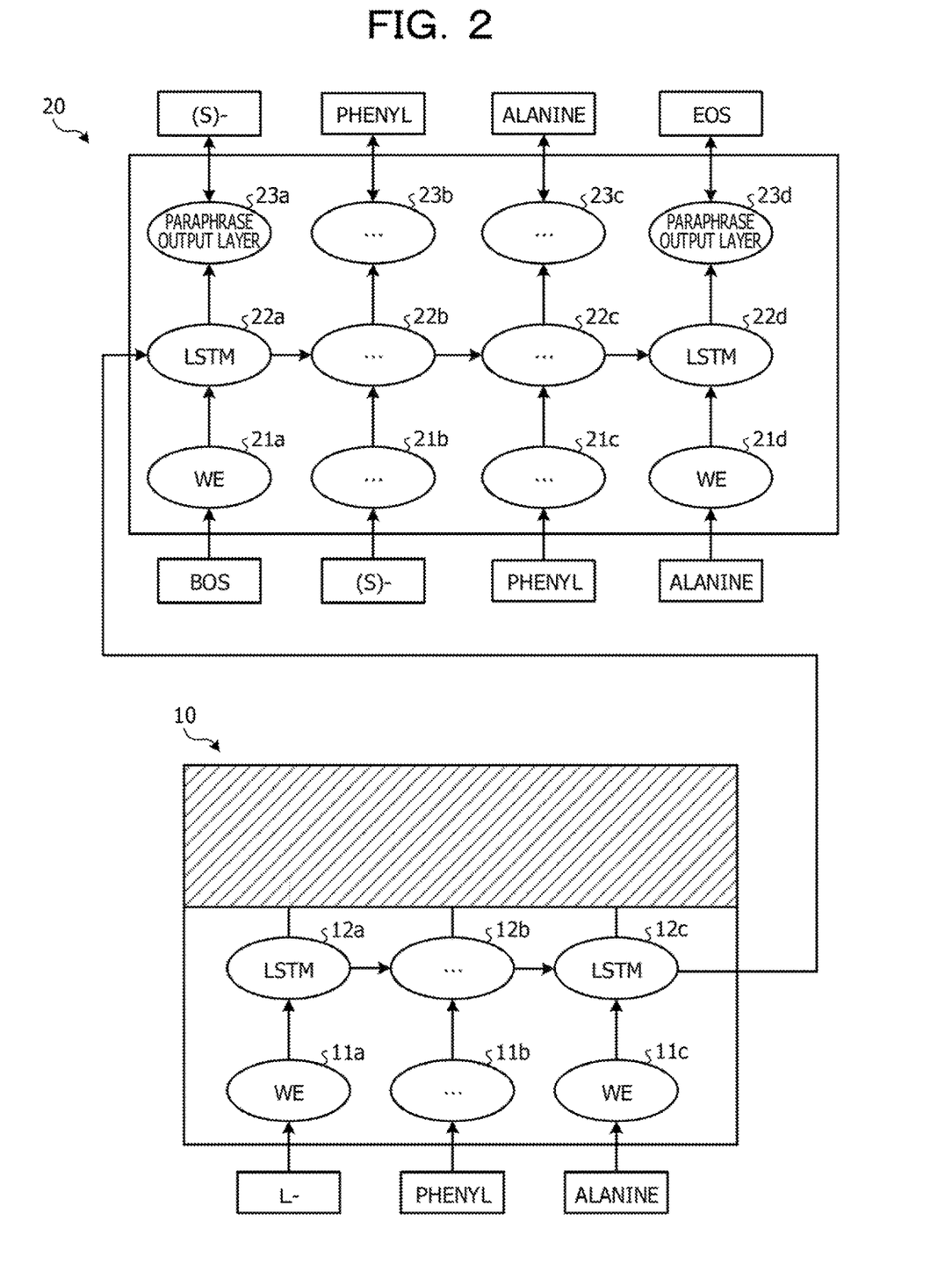
FIG. 2 is a diagram for explaining an example of a second learning phase.

FIG. 2 is a diagram for explaining an example of the second learning phase. The information processing apparatus executes the encoder 10 and a decoder 20. The information processing apparatus sets the parameters learned in the first phase described with reference to FIG. 1 in the WE 11 and the LSTM 12.

The decoder 20 includes WEs 21a to 21d, LSTMs 22a to 22d, and paraphrase output layers 23a to 23d. When appropriate, the WEs 21a to 21d are collectively represented as the WE 21. The LSTMs 22a to 22d are collectively represented as the LSTM 22. The paraphrase output layers 23a to 23d are collectively represented as the paraphrase output layer 23.

The WE 21 is a model for generating a distributed representation (vector) of each word included in the input sentence of a paraphrase. In this embodiment, as an example, a named entity of a compound (a named entity of a paraphrase) is described as an input of a paraphrase, but the present disclosure is not limited thereto. It is also possible to learn a partially paraphrased sentence as an input.

"An input of a paraphrase" is an input in which a compound represented by an input sentence input to the encoder 10 is paraphrased. For example, one of a plurality of input sentences of paraphrases corresponding to an input sentence "L-phenylalanine" input to the encoder 10 is "(S)-phenylalanine". "L-phenylalanine" and "(S)-phenylalanine" are inputs that represent the compound "phenylalanine".

The LSTM 22 accepts an intermediate representation at the clock time when the last word CHEM of the input is input from the LSTM 12, and accepts an input of a vector of the word from the WE 21. The LSTM 22 calculates a hidden state vector by performing calculation based on the intermediate representation, the vector of the word, and the parameter $\theta_{22}$ of the LSTM 22. The LSTM 22 passes the hidden state vector to the paraphrase output layer 23 and the LSTM for the next word. The LSTM 22 repeatedly performs the processing described above every time a word vector is input.

The paraphrase output layer 23a is an output layer that outputs a probability distribution of each word based on a hidden state vector input from the LSTM 22.

In FIG. 2, with respect to the words "L-", "phenyl", and "alanine" Included in the input sentence for learning, the words "(S)-", "phenyl", and "alanine" included in the input sentence of the paraphrase are given. When sequentially inputting the words included in the input sentence of the paraphrase to the WE 21, the information processing apparatus first inputs, for example, "begin of sentence (BOS)" as a word indicating the beginning of the sentence. The information processing apparatus sets "end of sentence (EOS)" as a word indicating an end of correct answer information (the input sentence of the paraphrase) which is compared in a case where a loss with respect to the probability distribution output from the paraphrase output layer 23 is calculated.

The information processing apparatus sequentially inputs the words "L-", "phenyl", and "alanine" included in the input sentence for learning to the WE 11 in the encoder 10, updates an intermediate representation of the LSTM 22 by an intermediate representation updated in the LSTM 12c at the time when "alanine" is input, and then sequentially performs processing from the following first dock time to a fourth cock time.

The information processing apparatus calculates a hidden state vector by inputting an output of the LSTM 12 in the encoder 10 and a vector of the word "BOS" to the LSTM 22a at the first dock time. The information processing apparatus inputs the hidden state vector to the paraphrase output layer 23a, and outputs a probability distribution of each word. The information processing apparatus compares the probability distribution output from the paraphrase output layer 23a with a correct answer word "(S)-" to calculate a loss at the first dock time.

The information processing apparatus calculates a hidden state vector by inputting the previous output of the LSTM 22 and a vector of the word "(S)-" to the LSTM 22b at the second clock time. The information processing apparatus inputs the hidden state vector to the paraphrase output layer 23b, and outputs a probability distribution of each word. The information processing apparatus compares the probability distribution output from the paraphrase output layer 23b with a correct answer word "phenyl" to calculate a loss at the second dock time.

The information processing apparatus calculates a hidden state vector by inputting the previous output of the LSTM 22 and a vector of the word "phenyl" to the LSTM 22c at the third dock time. The information processing apparatus inputs the hidden state vector to the paraphrase output layer 23c, and outputs a probability distribution of each word. The information processing apparatus compares the probability distribution output from the paraphrase output layer 23c with a correct answer word "alanine" to calculate a loss at the third clock time.

The information processing apparatus calculates a hidden state vector by inputting the previous output of the LSTM and a vector of the word "alanine" to the LSTM 22d at the fourth dock time. The information processing apparatus inputs the hidden state vector to the paraphrase output layer 23d, and outputs a probability distribution of each word. The information processing apparatus compares the probability distribution output from the paraphrase output layer 23d with a correct answer word "EOS" to calculate a loss at the fourth dock time.

The information processing apparatus updates the parameter $\theta_{12}$ of the LSTM 12, a parameter of the WE 11, a parameter $\theta_{22}$ of the LSTM 22, and a parameter of the WE 21 such that the losses calculated from the first dock time to the fourth dock time are minimized. For example, based on the losses from the first clock time to the fourth dock time, the information processing apparatus executes optimization of a log likelihood to update the parameter $\theta_{12}$ of the LSTM 12, the parameter of the WE 11, the parameter $\theta_{22}$ of the LSTM 22, and the parameter of the WE 21.

The information processing apparatus repeatedly performs the processing described above based on inputs of paraphrase pairs and correct answer information in addition to data for learning of the named entity extraction, thereby simultaneously learning the encoder 10 and the decoder 20.

The information processing apparatus performs the processing of extracting each named entity from text data by using the encoder 10, among the encoder 10 in the first learning phase as illustrated in FIG. 1, and the encoder 10 and the decoder 20 learned in the second learning phase as illustrated in FIG. 2.

For example, the information processing apparatus executes the encoder 10, and sets the parameter $\theta_{12}$ and the parameter of the WE 11 learned in the first learning phase and the second learning phase as parameters of the encoder 10. When receiving an input sentence, the information processing apparatus sequentially inputs respective words included in the input sentence to the WE 11 of the encoder 10, and determines whether an input word is "B-CHEM", "I-CHEM", "E-CHEM", or "O" (or a word other than the named entity) from probability distributions output from the named entity output layer 13.

When the "B-CHEM" is output, the information processing apparatus determines that the word input to the WE 11 is a beginning word. When the "E-CHEM" is output, the information processing apparatus determines that the word input to the WE 11 is an end word. The information processing apparatus extracts each word from the beginning word of the input sentence to the end word as a named entity. The information processing apparatus repeatedly performs the processing described above to extract named entities from the input sentence.

As described above, the information processing apparatus according to the present embodiment learns the parameters of the encoder 10 based on the input sentence and the correct answer tags corresponding to the input sentence in the first learning phase. The information processing apparatus simultaneously learns the parameters of the encoder 10 and the decoder 20 by using the input sentence and the input sentence of the paraphrase in the second learning phase. By performing such learning, the information processing apparatus is able to learn a pattern having the same meaning as that of the paraphrase pair but having the different representation from that of the paraphrase pair, and thereby, is able to extract a plurality of named entities which have the same meaning but have the different representations.

In this embodiment, as an example, the second learning phase is performed after the first learning phase is performed, but the first learning phase may be performed after the second learning phase is performed, or the first learning phase and the second learning phase may be alternately performed.

Figure 3:
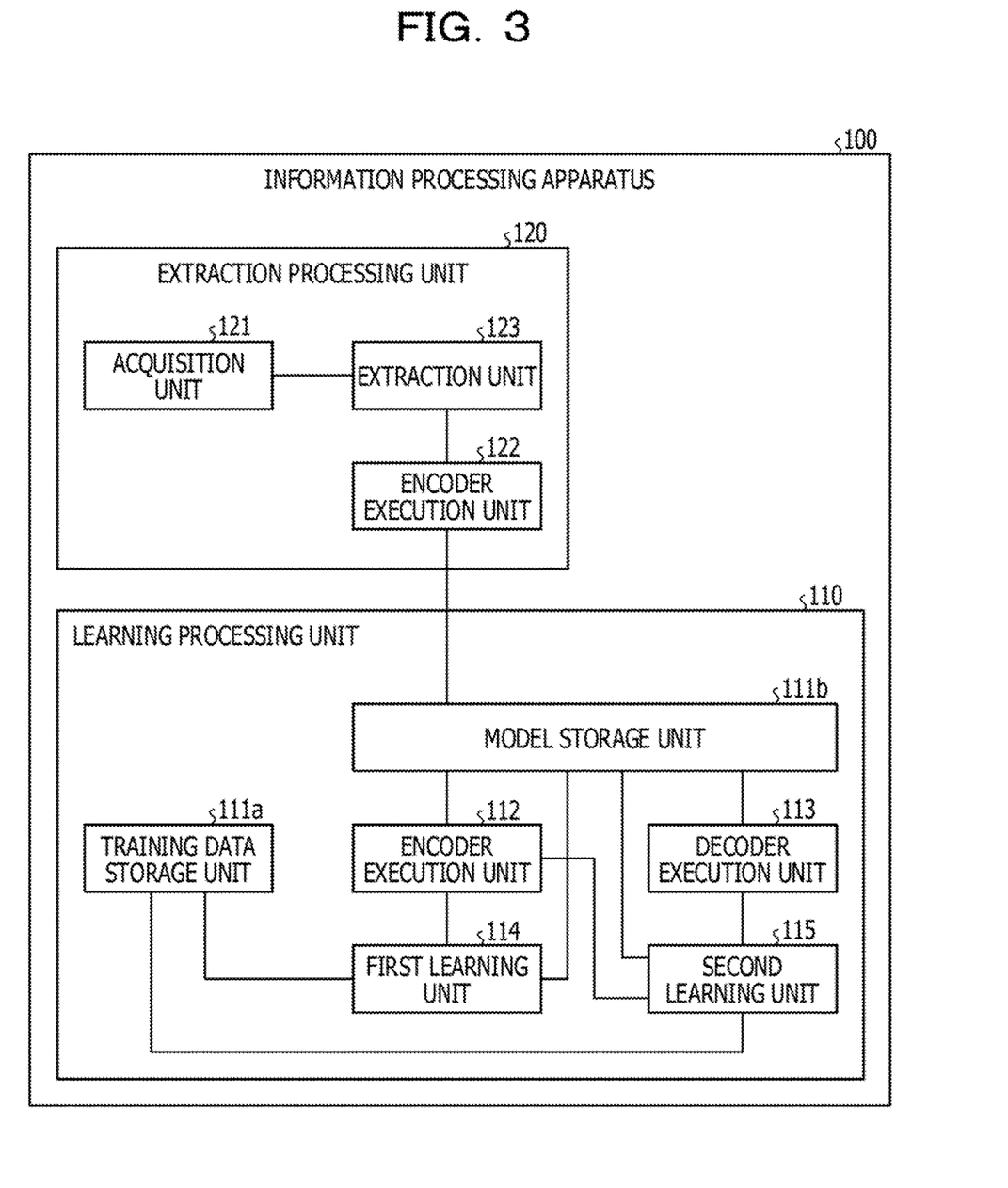
FIG. 3 is a functional block diagram illustrating a configuration of an information processing apparatus according to the present embodiment.

The following describes a configuration of the information processing apparatus according to the present embodiment. FIG. 3 is a functional block diagram illustrating the configuration of the information processing apparatus according to the present embodiment. As illustrated in FIG. 3, the information processing apparatus 100 includes a learning processing unit 110 and an extraction processing unit 120.

The learning processing unit 110 and the extraction processing unit 120 are virtually implemented by, for example, a hardware processor to be described below. Examples of such a processor include general-purpose computing on graphics processing units (GPGPU), a GPU duster, a central processing unit (CPU), a microprocessor unit (MPU), and the like. In other words, for example, the processor expands programs corresponding to the learning processing unit 110 and the extraction processing unit 120 as processes in a memory such as a random-access memory (RAM) to virtually implement the processing units described above. Although the GPGPU, the GPU duster, the CPU, and the MPU are described as examples of the processor, the functional units described above may be implemented by any processor regardless of whether the processor is a general-purpose type or a special type. In addition, the processing units described above may be implemented by hard wired logic such as an application-specific integrated circuit (ASIC) or a field-programmable gate array (FPGA).

A training data storage unit 11a and a model storage unit 111b correspond to a semiconductor memory element such as a random access memory (RAM), a read-only memory (ROM), or a flash memory, or a storage device such as a hard disk drive (HDD).

The learning processing unit 110 is a processing unit that performs learning in the first learning phase explained in FIG. 1 and learning in the second learning phase explained in FIG. 2. The learning processing unit 110 includes the training data storage unit 111a, the model storage unit 111b, an encoder execution unit 112, a decoder execution unit 113, a first learning unit 114, and a second learning unit 115.

The training data storage unit 111a is a storage unit that stores training data for associating an input sentence for learning (for the named entity extraction) with correct answer tags of respective words included in the input sentence. The training data storage unit 111a holds information in which an input sentence for learning and before paraphrasing and an input sentence after paraphrasing are associated with each other.

Figure 4:
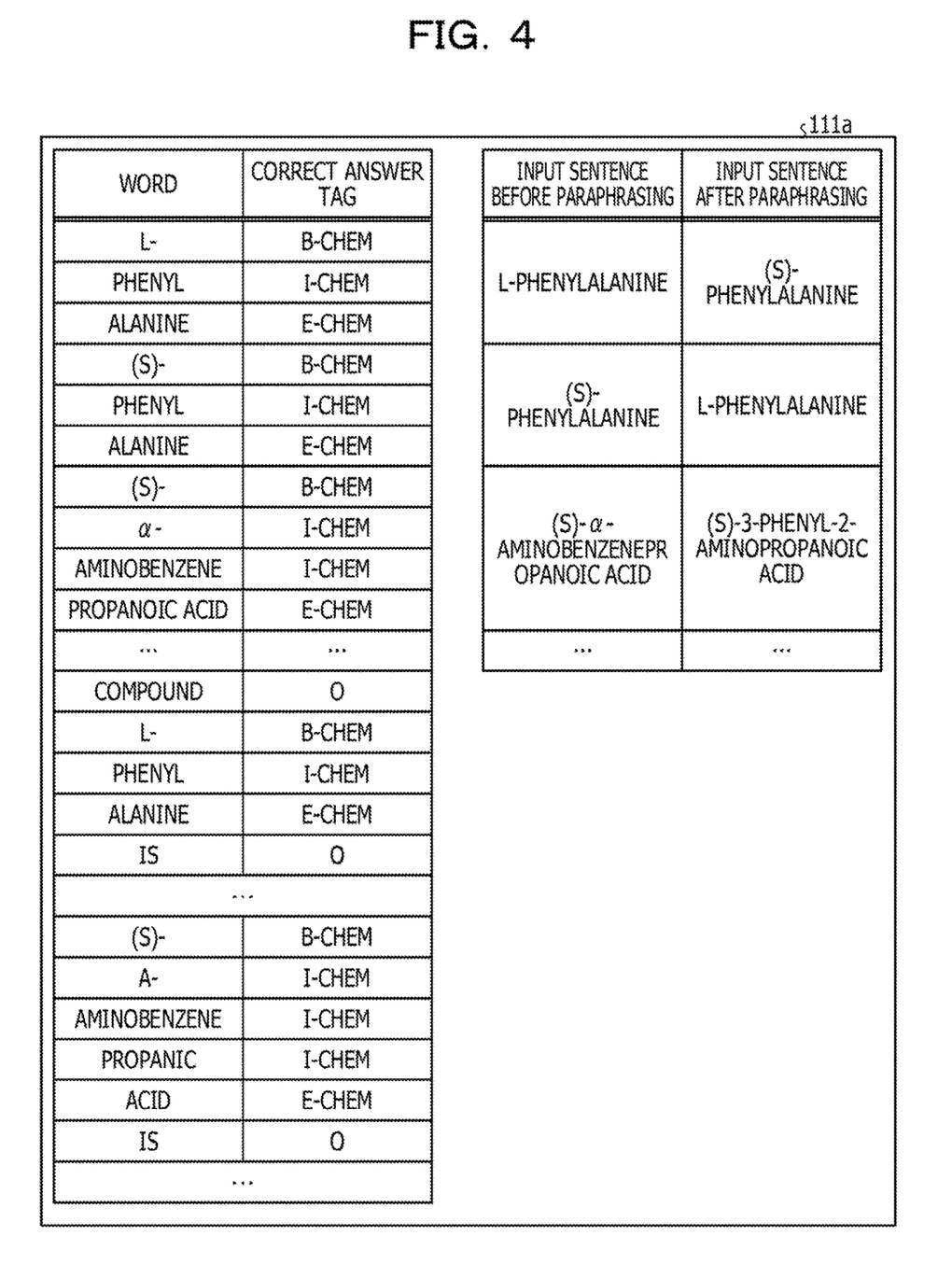
FIG. 4 is a diagram illustrating an example of a data structure of a training data storage unit.

FIG. 4 is a diagram illustrating an example of a data structure of a training data storage unit. As illustrated in FIG. 4, the training data storage unit 111a associates each word included in an input sentence (for the named entity extraction) with correct answer tags. For example, the input sentence "L-phenylalanine" includes, in this order, the words "L-", "phenyl", and "alanine". The correct answer tag of the word "L-" is "B-CHEM", the correct answer tag of the word "phenyl" is "I-CHEM", and the correct answer tag of the word "alanine" is "E-CHEM".

As illustrated in FIG. 4, the training data storage unit 111a associates the input sentence with a paraphrase pair. For example, the input sentence of the paraphrase corresponding to the input sentence "L-phenylalanine" is "(S)-phenylalanine".

The model storage unit 111b is a storage unit that stores the parameters $\theta_{12}$ of the LSTM 12 and the parameter of the WE 11 for the encoder 10, and the parameter $\theta_{22}$ of the LSTM 22 and the parameter of the WE 21 for the decoder 20. Before learning, initial values are set in the respective parameters of the model storage unit 111b.

The encoder execution unit 112 is a processing unit that executes the encoder 10 explained in FIG. 1 and FIG. 2. For example, the encoder execution unit 112 expands the WE 11, the LSTM 12, and the named entity output layer 13 in a work area. The encoder execution unit 112 sets the parameter of the WE 11 and the parameter $\theta_{12}$ of the LSTM 12 which are stored in the model storage unit 111b in the WE 11 and the LSTM 12. When the parameter $\theta_{12}$ of the LSTM 12 and the parameter of the WE 11 are updated by the first learning unit 114 and the second learning unit 115 to be described later, the encoder execution unit 112 sets the updated parameter of the WE 11 and the updated parameter $\theta_{12}$ of the LSTM 12 in the WE 11 and the LSTM 12, respectively.

The decoder execution unit 113 is a processing unit that executes the decoder 20 described with reference to FIG. 2. For example, the decoder execution unit 113 expands the WE 21, the LSTM 22, and the paraphrase output layer 23 in the work area. The decoder execution unit 113 sets the parameter of the WE 21 and the parameter of the LSTM 22 which are stored in the model storage unit 111b in the WE 21 and the LSTM 22. When the parameter $\theta_{22}$ of the LSTM 22 and the parameter of the WE 21 are updated by the first learning unit 114 and the second learning unit 115 to be described later, the decoder execution unit 113 sets the updated parameter of the WE 21 and the updated parameter $\theta_{22}$ of the LSTM 22, in the WE 21 and the LSTM 22, respectively.

The first learning unit 114 is a processing unit that performs learning of the first learning phase explained in FIG. 1. The first learning unit 114 acquires each word included in the input sentence for learning and each correct answer tag from the training data storage unit 111a. The first learning unit 114 inputs each word included in the input sentence to the WE 11 in the encoder 10 executed by the encoder execution unit 112, and calculates each loss based on the probability distribution output from the named entity output layer 13a via the LSTM 12 and the correct answer tag.

The first learning unit 114 sequentially inputs, to the WE 11, respective words from the beginning word of the input sentence for learning to the end word to calculate a loss at each cock time. The first learning unit 114 learns the parameter $\theta_{12}$ of the LSTM 12 and the parameter of the WE 11 such that each loss calculated at each time is minimized. The first learning unit 114 updates the model storage unit 111b according to the learned parameter $\theta_{12}$ of the LSTM 12 and the learned parameter of the WE 11.

The second learning unit 115 is a processing unit that performs learning of the second learning phase explained in FIG. 2. The second learning unit 115 acquires, from the training data storage unit 111a, the respective words included in the input sentence for learning and the respective words included in the input sentence of the paraphrase.

First, the second learning unit 115 sequentially inputs the respective words (from the beginning word to the end word) included in the input sentence to the WE 11 in the encoder 10 executed by the encoder execution unit 112, and calculates an intermediate representation of the LSTM 12 at the dock time when the end word is input. In the following description, the intermediate representation of the LSTM 12 at the time when the end word is input is represented as the "intermediate representation of the input sentence".

Subsequently, the second learning unit 115 sets the intermediate representation of the input sentence in the LSTM 22 in the decoder 20 executed by the decoder execution unit 113. The second learning unit 115 inputs each of the words (each of the words to which the word "BOS" is added at the beginning) of the input sentence of the paraphrase to the WE 21 in the decoder 20, and calculates a loss based on the probability distribution output from the paraphrase output layer 23 via the LSTM 22 and the correct answer tag. The respective correct answer tags for which the second learning unit 115 uses in calculating are obtained by adding the word "EOS" at the end of the respective words included in the input sentence of the paraphrase.

The second learning unit 115 sequentially inputs, to the WE 21, the respective words from the beginning word "BOS" of the input sentence of the paraphrase to the end word to calculate a loss at each dock time. The second learning unit 115 simultaneously learns the parameter $\theta_{22}$ of the LSTM 22 and the parameter of the WE 21, and the parameter $\theta_{12}$ of the LSTM 12, and the parameter of the WE 11 such that each loss calculated at each dock time is minimized. The second learning unit 115 updates the model storage unit 111b according to the parameter $\theta_{22}$ of the LSTM 22 and the parameter of the WE 21, and the parameter $\theta_{12}$ of the LSTM 12 and the parameter of the WE 11 that have been learned.

As described above, the first learning unit 114 and the second learning unit 115 perform the processing, and thus the respective parameters of the model storage unit 111b are learned.

The extraction processing unit 120 is a processing unit that extracts a named entity from an input sentence (text data) to be processed, based on the parameters of the encoder 10 learned by the learning processing unit 110. The extraction processing unit 120 includes an acquisition unit 121, an encoder execution unit 122, and an extraction unit 123.

The acquisition unit 121 is a processing unit that acquires an input sentence (text data) that is an extraction target of a named entity. The acquisition unit 121 may acquire an input sentence from an input device such as a keyboard, or may acquire an input sentence from an external apparatus via a network. When a portable storage device such as a Universal Serial Bus (US) memory is coupled to the information processing apparatus 100, the acquisition unit 121 may acquire an input sentence stored in the portable storage device. The acquisition unit 121 outputs information of the acquired input sentence to the extraction unit 123.

The encoder execution unit 122 is a processing unit that executes the encoder 10. For example, the encoder execution unit 122 expands the WE 11, the LSTM 12, and the named entity output layer 13 in a work area. The encoder execution unit 122 sets the parameter of the WE 11 and the parameter $\theta_{12}$ of the LSTM 12 which are stored in the model storage unit 111b, in the WE 11 and the LSTM 12, respectively. It is assumed that the parameter of the WE 11 and the parameter $\theta_{12}$ of the LSTM 12 which are stored in the model storage unit 111b have been learned by the learning processing unit 110.

When receiving the input sentence from the acquisition unit 121, the extraction unit 123 sequentially inputs the respective words included in the input sentence to the WE 11 in the encoder 10 executed by the encoder execution unit 122. The extraction unit 123 determines, from the probability distribution output from the named entity output layer 13, whether each of the input words is "B-CHEM", "I-CHEM", or "E-CHEM" (or other words).

When "B-CHEM" is output, the extraction unit 123 determines that the word input to the WE 11 is the beginning word. When "E-CHEM" is output, the extraction unit 123 determines that the word input to the WE 11 is the end word. The extraction unit 123 extracts each word from the beginning word of the input sentence to the end word as the named entity. The information processing apparatus repeatedly performs the processing described above to extract named entities from the input sentence. The extraction unit 123 may output the respective extracted named entity to a display device (not illustrated), and may generate information in which the input sentence and the extracted named entities are associated with each other to store the generated information in a storage unit (not illustrated). The extraction unit 123 may output the information of the respective named entitles extracted from the input sentence to an external apparatus.

Figure 5:
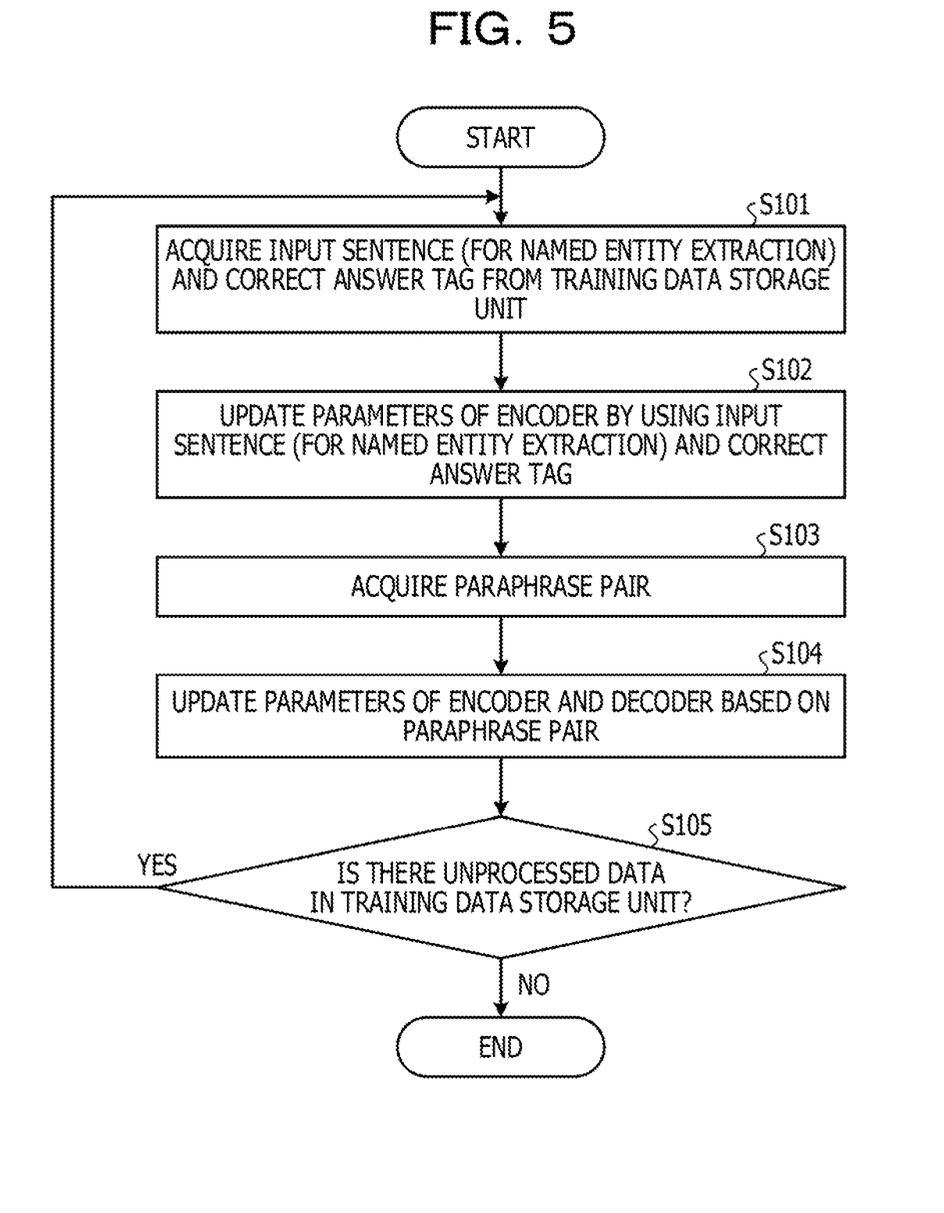
FIG. 5 is a flowchart illustrating learning processing according to the present embodiment.

Next, an example of a processing procedure by the information processing apparatus 100 according to the present embodiment will be described. FIG. 5 is a flowchart illustrating learning processing according to the present embodiment. Before performing the processing in FIG. 5, the encoder execution unit 112 executes the encoder 10 to set the initial values of the parameters. The decoder execution unit 113 executes the decoder 20 to set the initial values of the parameters.

As illustrated in FIG. 5, the first learning unit 114 in the information processing apparatus 100 acquires an input sentence (for named entity extraction) and correct answer tags from the training data storage unit 111a (step S101). The first learning unit 114 learns the parameters of the encoder 10 by using the input sentence (for the named entity extraction) and the correct answer tags, and updates the parameters of the model storage unit 111b (step S102).

The second learning unit 115 in the information processing apparatus 100 acquires the input sentence (for the named entity extraction) and the paraphrase pair which are paired from the training data storage unit 111a (step S103). The second learning unit 115 learns the parameters of the encoder 10 and the parameters of the decoder 20 based on the input sentence (for the named entity extraction) and the paraphrase pair, and updates the parameters of the model storage unit 111b (step S104).

When there is unprocessed data in the training data storage unit 111a (Yes in step S105), the information processing apparatus 100 moves to step S101. On the other hand, when there is no unprocessed data in the training data storage unit 111a (No in step S105), the information processing apparatus 100 ends the processing.

Figure 6:
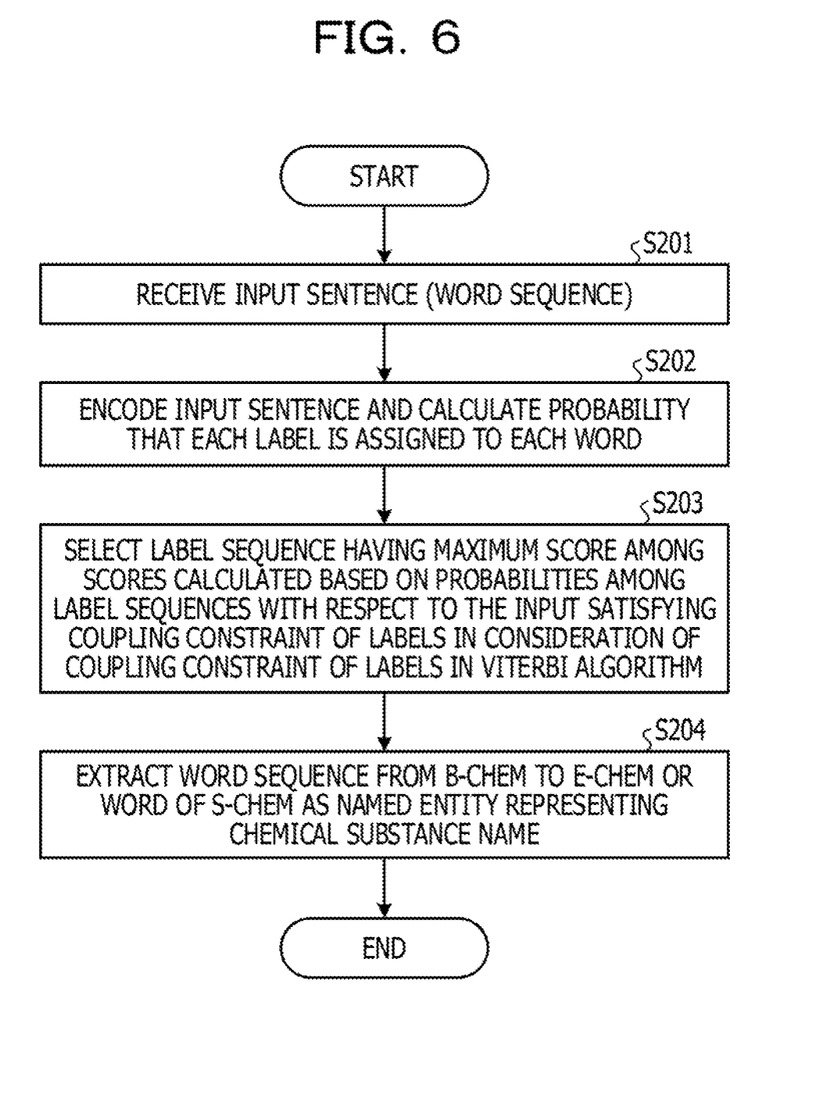
FIG. 6 is a flowchart illustrating extraction processing according to the present embodiment.

FIG. 6 is a flowchart illustrating extraction processing according to the present embodiment. Before performing the processing in FIG. 6, the encoder execution unit 122 executes the encoder 10 to set the learned parameters stored in the model storage unit 111b, in the encoder 10. When the named entity extraction is performed, the entire sentence is encoded and a probability in which each label is assigned to each word is calculated, similarly to when the learning is performed. After that, a label sequence having a maximum score among scores which are calculated based on the probabilities is selected among the label sequences with respect to an input satisfying a coupling constraint of labels that only "I-CHEM" or "E-CHEM" may be coupled after "B-CHEM". It is commonly known that, in the selection of the label sequence satisfying this constraint, the calculation is possible by applying a Viterbi algorithm.

As illustrated in FIG. 6, the acquisition unit 121 in the information processing apparatus 100 receives the input sentence (word sequence) (step S201). The extraction unit 123 in the information processing apparatus 100 encodes the input sentence, and calculates the probability in which each label is assigned to each word (step S202).

The extraction unit 123 selects the label sequence having the maximum score among scores which are calculated based on the probabilities among the label sequences with respect to the input satisfying the coupling constraint of the labels in consideration of the coupling constraint of the labels in the Viterbi algorithm (step S203). The extraction unit 123 executes the Viterbi algorithm based on the technique described in the literature (Andrew J. Viterbi., "Error bounds for convolutional codes and an asymptotically optimum decoding algorithm", IEEE Transactions on Information Theory 13 (2), 260-269, April 1967).

The extraction unit 123 extracts the word sequence from B-CHEM to E-CHEM or the word of S-CHEM as a named entity representing a chemical substance name (step S204).

Next, effects achieved by the information processing apparatus 100 according to the present embodiment will be described. In the first learning phase, the information processing apparatus 100 according to the present embodiment learns the parameters of the encoder 10 based on an input sentence and correct answer tags corresponding to the input sentence. In the second learning phase, the information processing apparatus 100 simultaneously learns the parameters of the encoder 10 and the parameters of the decoder 20 by using the input sentence and an input sentence of a paraphrase. By performing such learning, the information processing apparatus 100 may perform learning for the named entity extraction and may learn a pattern having the same entity as the paraphrase pair but having the different representation from the paraphrase pair. As a result, it becomes possible to cope with the same entity having different representations even when the named entity extraction is performed.

The information processing apparatus 100 inputs an input sentence (text data) to the encoder 10 learned in the first learning phase and the second learning phase, so that it is possible to extract a plurality of named entities having the same meaning but having the different representations.

In this embodiment, as an example, the case has been described where the learning processing unit 110 learns the encoder 10 and the decoder 20 by using the input sentence related to the compound and the input sentence of the paraphrase, but the present disclosure is not limited thereto. For example, the same object for which a plurality of named entities exists and a pattern preferably exists for each named entity may be learned, similarly to the case of the named entities of the compound.

Figure 7:
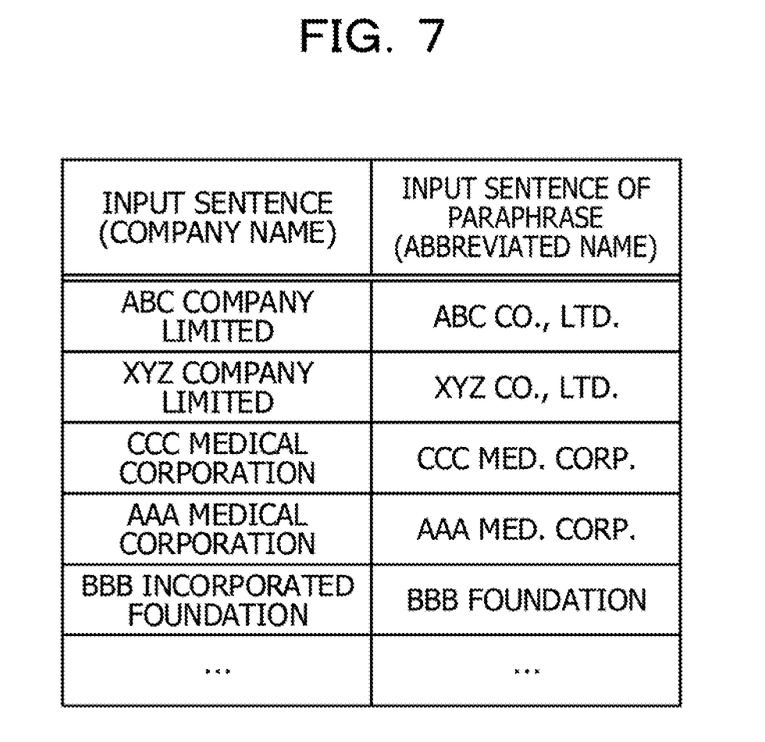
FIG. 7 is a diagram (1) for explaining an example of other named entities that are capable of learning.
Figure 8:
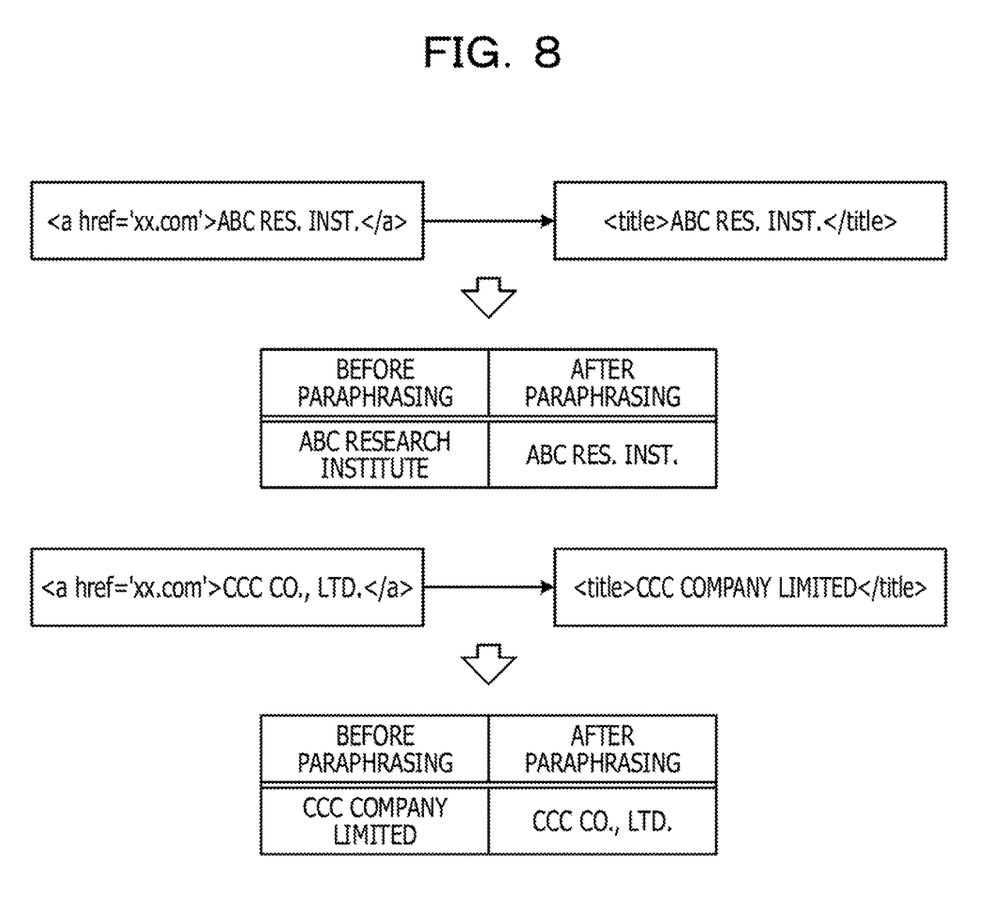
FIG. 8 is a diagram (2) for explaining an example of other named entities that are capable of learning.

FIG. 7 and FIG. 8 are diagrams for explaining an example of other named entities that are capable of learning. As illustrated in FIG. 7, a company name may be written in text by using an abbreviated name. For example, the learning processing unit 110 may learn the parameters of the encoder 10 and the decoder 20 by using an input sentence (company name) and an input sentence of a paraphrase (abbreviated name). This learning makes it possible to extract named entities related to the company name.

As illustrated in FIG. 8, a character sequence included in a link of a web page and a named entity of a page corresponding to the link may be associated with each other. For example, it is assumed that "<a href='xx.com'>CCC Co., Ltd.</a>" links to a page having a title "CCC Company Limited". Then, it is possible to acquire the paraphrase pair "CCC Co., Ltd.</a>" and "CCC Company Limited", and the learning processing unit 110 may use the acquired paraphrase pair for learning the parameters of the encoder 10 and the decoder 20. By performing such learning, a code 50 may be encoded to extract the named entity from the code 50.

Although illustration is omitted, examples of other named entities that are capable of learning include a personal name. For example, text data exchanged by a social networking service (SNS) or the like is given an official name and a nickname for the same person in many cases. The learning processing unit 110 may learn the parameters of the encoder 10 and the decoder 20 by using an input sentence (official name) and an input sentence of a paraphrase (nickname).

Figure 9:
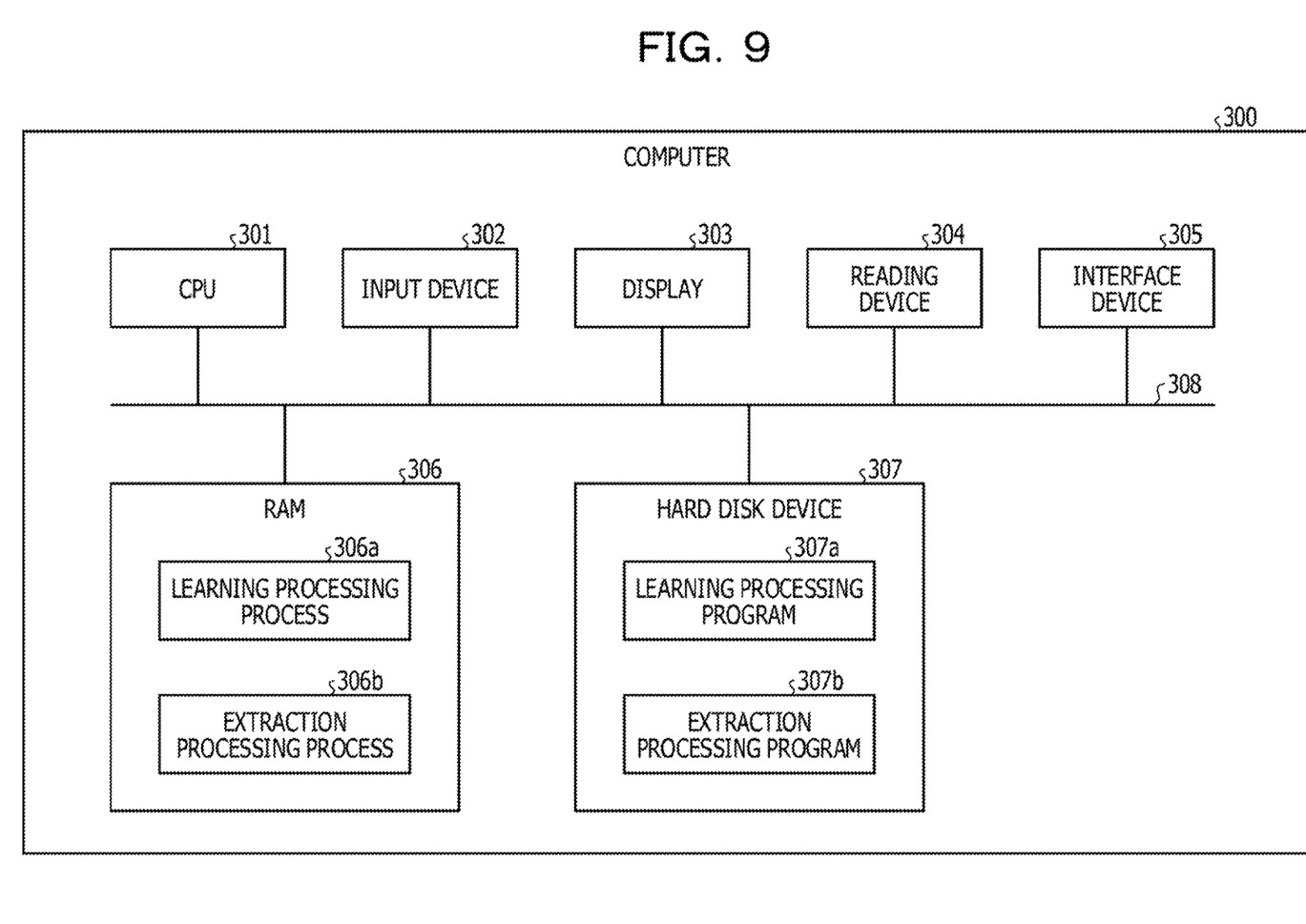
FIG. 9 is a diagram illustrating an example of a hardware configuration of a computer that achieves a function similar to that of the information processing apparatus according to the present embodiment.

Next, an example of a hardware configuration of a computer that achieves a function similar to that of the information processing apparatus 100 represented in the present embodiment will be described. FIG. 9 is a diagram illustrating an example of the hardware configuration of the computer that achieves the function similar to that of the information processing apparatus according to the present embodiment.

As illustrated in FIG. 9, a computer 300 includes a CPU 301 that executes various kinds of arithmetic processing, an input device 302 that accepts an input of data from a user, and a display 303. The computer 300 also includes a reading device 304 that reads a program or the like from a storage medium and an interface device 305 that exchanges data with an external apparatus or the like via a wired or wireless network. The computer 300 also includes a RAM 306 that temporarily stores various kinds of information and a hard disk device 307. The respective devices 301 to 307 are coupled to a bus 308.

The hard disk device 307 includes a learning processing program 307a and an extraction processing program 307b. The CPU 301 reads out the learning processing program 307a and the extraction processing program 307b, and develops them in the RAM 306.

The learning processing program 307a functions as a learning processing process 306a. The extraction processing program 307b functions as an extraction processing process 306b.

The processing of the learning processing process 306a corresponds to the processing by the learning processing unit 110. The processing of the extraction processing process 306b corresponds to the processing by the extraction processing unit 120.

The respective programs 307a and 307b do not have to be stored in the hard disk device 307 from the beginning, in some cases. For example, the respective programs may be stored in a "portable physical medium" that is to be inserted in the computer 300, such as a flexible disk (FD), a compact disc read-only memory (CD-ROM), a digital versatile disk (DVD), a magneto-optical disc, an integrated circuit (IC) card, or the like. The computer 300 may read and execute the respective programs 307a and 307b.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A learning method to be executed by a computer, the learning method comprising:
   inputting a first sentence that includes a first word representing a target to—an encoder, the encoder outputting an output word included in the first input sentence based on the first input sentence;
   changing a first parameter of the encoder so as to decrease a difference between the output word output from the encoder and correct answer information corresponding to the first input sentence;
   setting words for a start of input and an end of input to be included in a second sentence that represents the target as a paraphrase of the first sentence;

inputting an intermediate representation and the set words to a decoder, the intermediate representation being generated by inputting the first sentence to the encoder, the decoder outputting a second word to which a label indicating an end of a word is attached after the output word included in the input sentence based on the input sentence and the intermediate representation; and changing the first parameter and a second parameter of the decoder so as to increase a probability to which the second word output from the decoder is attached a label regarding correct answer information corresponding to the second sentence, based on a probability distribution including a probability a plurality of types of labels.

2. The learning method according to claim 1, wherein the encoder and the decoder include a recurrent neural network (RNN), and the changing the first parameter and the second parameter include changing a parameter of the RNN.

3. The learning method according to claim 1, wherein the target includes a compound, a person, or a company.

4. A non-transitory computer-readable storage medium storing a learning program that causes at least one computer to execute a process, the process comprising:

inputting a first sentence that includes a first word representing a target to an encoder, the encoder outputting an output word included in the first input sentence based on the first input sentence;

changing a first parameter of the encoder so as to decrease a difference between the output word output from the encoder and correct answer information corresponding to the first input sentence;

setting words for a start of input and an end of input to be included in a second sentence that represents the target as a paraphrase of the first sentence;

inputting an intermediate representation and the set words to a decoder, the intermediate representation being generated by inputting the first sentence to the encoder, the decoder outputting a second word to which a label indicating an end of a word is attached after the output word included in the input sentence based on the input sentence and the intermediate representation; and changing the first parameter and a second parameter of the decoder so as to increase a probability to which the second word output from the decoder is attached a label regarding correct answer information corresponding to the second sentence, based on a probability distribution including a probability a plurality of types of labels.

5. An information processing apparatus, comprising:
a memory; and
a processor coupled to the memory and the processor configured to:

input a first sentence that includes a first word representing a target to an encoder, the encoder outputting an output word included in the first input sentence based on the first input sentence, change a first parameter of the encoder so as to decrease a difference between the output word output from the encoder and correct answer information corresponding to the first input sentence, set words for a start of input and an end of input to be included in a second sentence that represents the target as a paraphrase of the first sentence;

input an intermediate representation and the set words to a decoder, the intermediate representation being generated by inputting the first sentence to the encoder, the decoder outputting a second word to which a label indicating an end of a word is attached after the output word included in the input sentence based on the input sentence and the intermediate representation; and change the first parameter and a second parameter of the decoder so as to increase a probability to which the second word output from the decoder is attached a label regarding correct answer information corresponding to the second sentence, based on a probability distribution including a probability a plurality of types of labels.

6. The information processing apparatus according to claim 5, wherein each of encoder and the decoder includes a recurrent neural network (RNN), and the changing the first parameter changes a parameter of the RNN of the encoder, and the changing the second parameter changes a parameter of the RNN of the decoder.

7. The information processing apparatus according to claim 6, wherein the processor is configured to change the parameter of the RNN of the decoder when the intermediate representation and the second sentence are input to the decoder.

8. The information processing apparatus according to claim 5, wherein the target includes a compound, a person, or a company.

9. The learning method according to claim 1, wherein the value output from the encoder is probability distribution of labeling the word selected from a label indicating a beginning of the word, a label indicating an end of the word, and a label indicating a middle of the word.

* * * * *